United States Patent
Shim et al.

(10) Patent No.: US 9,973,061 B2
(45) Date of Patent: May 15, 2018

(54) DC MOTOR INCLUDING A ROTATION DETECTION UNIT

(71) Applicant: SAMSUNG ELECTRONICS CO., LTD., Suwon-si, Gyeonggi-do (KR)

(72) Inventors: Jae-kyu Shim, Suwon-si (KR); Woo-jong Cho, Suwon-si (KR); Bon-min Koo, Seoul (KR); Kun-woo Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 516 days.

(21) Appl. No.: 14/691,811

(22) Filed: Apr. 21, 2015

(65) Prior Publication Data
US 2015/0303775 A1   Oct. 22, 2015

(30) Foreign Application Priority Data

Apr. 21, 2014 (KR) .......................... 10-2014-0047602

(51) Int. Cl.
| H02K 11/00 | (2016.01) |
| H02K 13/00 | (2006.01) |
| H02K 11/215 | (2016.01) |
| H02K 11/22 | (2016.01) |
| H02K 11/225 | (2016.01) |

(52) U.S. Cl.
CPC ......... *H02K 13/006* (2013.01); *H02K 11/215* (2016.01); *H02K 11/22* (2016.01); *H02K 11/225* (2016.01)

(58) Field of Classification Search
CPC ...... H02K 29/08; H02K 11/00; H02K 13/006; H02K 11/225; H02K 11/215; H02K 11/22; H02K 11/30

USPC .................................................. 310/68 B, 89
See application file for complete search history.

(56) References Cited

U.S. PATENT DOCUMENTS

| 4,829,254 A | 5/1989 | Baines |
| 5,013,946 A * | 5/1991 | Sata .......................... G01P 3/48 |
| | | 310/113 |
| 5,045,740 A * | 9/1991 | Hishinuma .............. H02K 7/14 |
| | | 310/156.45 |

(Continued)

FOREIGN PATENT DOCUMENTS

| CN | 87106152 A | 3/1988 |
| CN | 202160083 U | 3/2012 |
| JP | 4097882 B2 | 6/2008 |

OTHER PUBLICATIONS

Office Action issued in related application CN 201510190647.X, dated Apr. 5, 2017, with English language translation, 14 pages.

*Primary Examiner* — Naishadh Desai
(74) *Attorney, Agent, or Firm* — Drinker Biddle & Reath LLP

(57) ABSTRACT

A direct current (DC) motor including: a cylindrical frame, at least one end of which is open; a cylindrical end cover including an opening configured to block the at least one open end; a rotor including a rotor shaft supported by the frame and the end cover, and a rotor core installed on the rotor shaft; a commutator installed on the rotor shaft and arranged on one end of the rotor core; a cover unit installed on the rotor shaft, arranged between the rotor and the commutator, and including at least one location detection device; and a rotation detection unit installed in the end cover and configured to detect the at least one location detection device.

18 Claims, 12 Drawing Sheets

(56) References Cited

U.S. PATENT DOCUMENTS

| | | | | |
|---|---|---|---|---|
| 5,148,070 A | * | 9/1992 | Frye | H02K 29/08 |
| | | | | 310/168 |
| 2002/0027395 A1 | * | 3/2002 | Tsurukawa | H01R 39/06 |
| | | | | 310/237 |
| 2003/0111920 A1 | | 6/2003 | Lau | |
| 2014/0300254 A1 | * | 10/2014 | Yoshidomi | G01P 3/4815 |
| | | | | 310/68 B |

* cited by examiner

DC MOTOR INCLUDING A ROTATION DETECTION UNIT

CROSS-REFERENCE TO RELATED APPLICATIONS

This application claims the priority benefit under 35 U.S.C. § 119(a) of Korean Patent Application No. 10-2014-0047602, filed on Apr. 21, 2014, in the Korean Intellectual Property Office, the disclosure of which is incorporated herein by reference.

BACKGROUND

1. Field

Embodiments of the present disclosure relate to a direct current (DC) motor, and more particularly, to a DC motor including a rotation detection unit.

2. Description of the Related Art

When a current is applied to a direct current (DC) motor, the resulting electromagnetic force generated by a magnetic circuit included in the DC motor causes a rotor to rotate. Terminals that contact brushes change in accordance with the rotation of the rotor, and the rotor continuously rotates because the current flowing in a rotor coil periodically changes direction. The rotation velocity of the rotor is proportional to the current flowing in the rotor coil. However, the rotation velocity may also change according to a rotation load. It is therefore difficult to control the velocity or position of the rotor accurately by using only the DC motor. In particular, in the case of a DC motor being applied to an autofocus (AF) lens or a zoom lens of a compact camera that requires accurate control, a rotation detection sensor unit for detecting the amount of rotation of the rotor shaft is necessary.

Thus, a rotation velocity, amount of rotation, or angle of rotation of the DC motor may be detected by using a rotation detection unit, and based on the detected rotation velocity, amount of rotation, or angle of rotation of the DC motor, a location or velocity of a lens may be controlled. An optical encoder using a photo-interrupter (PI) type sensor or a photo-reflector (PR) type sensor, or a magnetic encoder using a Hall sensor or a magnetoresistive (MR) sensor may be generally used to determine a rotation velocity, amount of rotation, or angle of rotation of the DC motor.

A torque generated by the motor may be transmitted to an object via a gear unit installed on an external surface of a main body of the motor, but a rotation detection unit for detecting a rotation amount of a rotor shaft may be necessary to control a rotation amount or velocity of the motor. When the rotation detection unit is installed in the gear unit, space in a lengthwise direction of the motor is required. However, this space may be hinder miniaturization of a product to which the DC motor is applied.

SUMMARY

One or more embodiments include a miniaturized direct current (DC) motor including a rotation detection unit.

Additional aspects will be set forth in part in the description which follows and, in part, will be apparent from the description, or may be learned by practice of the presented embodiments.

According to various embodiments, a DC motor includes: a cylindrical frame, at least one end of which is open; a cylindrical end cover including an opening configured to block the at least one open end; a rotor including a rotor shaft supported by the frame and the end cover, and a rotor core installed on the rotor shaft; a commutator installed on the rotor shaft and arranged on one end of the rotor core; a cover unit installed on the rotor shaft, arranged between the rotor and the commutator, and including at least one location detection device; and a rotation detection unit installed in the end cover and configured to detect the at least one location detection device.

The DC motor may include a pair of brushes supported by the end cover, contacting the commutator, and spaced apart from each other along a circumferential direction of the rotor shaft. The rotation detection unit may be arranged between the pair of brushes along the circumferential direction of the rotor shaft.

The DC motor may include: a commutator installed on the rotor shaft and arranged on one end of the rotor core; and a pair of brushes supported by the end cover, contacting the commutator, and spaced apart from each other along a circumferential direction of the rotor shaft. The rotation detection unit may be arranged between an external wall of the end cover and any one of the pair of brushes, along a diameter direction of the rotor shaft.

The at least one location detection device may be arranged along a side portion of the cover unit, and the rotation detection unit may be inserted into an external wall of the end cover along a diameter direction of the rotor shaft.

The DC motor may further include additional rotation detection units.

The at least one location detection device may include one or more reflectors arranged at regular intervals along a circumferential direction of the cover unit, and the rotation detection unit may include a light source and a light reception unit.

The at least one location detection device may include one or more slits arranged at regular intervals along a circumferential direction of the cover unit, and the rotation detection unit may include a light source and a light reception unit.

The at least one location detection device may include permanent magnets that have an N pole and an S pole and are alternately arranged along a circumferential direction of the cover unit, and the rotation detection unit may include a magnetic flux sensor.

The at least one location detection device may include permanent magnets that have an N pole and an S pole and are alternately arranged along a circumferential direction of the cover unit, and the rotation detection unit may include coils that are arranged along a circumferential direction of the rotor shaft.

The DC motor may further include a flexible printed circuit board (FPCB) facing the cover unit and arranged on the end cover. The at least one location detection device may include one or more protrusions formed of conductors and arranged on a surface of the cover unit along a circumferential direction of the cover unit, and the rotation detection unit may include one or more metal members that are spaced apart from each other on the FPCB along a circumferential direction of the rotor shaft and generate a capacitance together with the one or more protrusions.

The at least one location detection device may include one or more protrusions formed of conductors and arranged on a surface of the cover unit along a circumferential direction of the cover unit, and the rotation detection unit may include one or more coils that are spaced apart from each other on the FPCB along a circumferential direction of the rotor shaft and generate an inductance together with the one or more protrusions.

The at least one location detection device may include materials having different permittivities and alternately arranged along a circumferential direction of the cover unit, and the rotation detection unit may include one or more metal members that are spaced apart from each other on the FPCB along a circumferential direction of the rotor shaft and generate a capacitance together with the materials having different permittivities.

The at least one location detection device may include metallic and non-metallic materials alternately arranged along a circumferential direction of the cover unit, and the rotation detection unit may include one or more coils that are spaced apart from each other on the FPCB along a circumferential direction of the rotor shaft and generate an inductance together with the metallic and non-metallic materials.

According to various other embodiments, a DC motor includes: a cylindrical frame, at least one end of which is open; a cylindrical end cover including an opening configured to block the at least one open end; a rotor including a rotor shaft supported by the frame and the end cover and a rotor core installed on the rotor shaft; a commutator installed on the rotor shaft and arranged on one end of the rotor core; a cover unit installed on the rotor shaft and arranged between the rotor and the commutator; and a rotation panel arranged between an end plate of the frame and the other end of the rotor core which is opposite to the one end of the rotor and including one or more location detection devices, wherein the commutator is arranged on the one end of the rotor core; and a rotation detection unit installed in the frame and configured to detect the one or more location detection devices.

The one or more location detection devices may be arranged on a surface of the rotation panel, which faces the rotation detection unit, along a circumferential direction of the rotation panel, and the rotation detection unit may be inserted into the end plate of the frame.

The one or more location detection devices may be arranged along a side portion of the rotation panel, and the rotation detection unit may be inserted into an external wall of the frame along a diameter direction of the rotor shaft.

The DC motor may further include one or more rotation detection units.

The one or more location detection devices may include one or more reflectors that are arranged at regular intervals along a circumferential direction of the rotation panel, and the rotation detection unit may include a light source and a light reception unit.

The one or more location detection devices may include one or more slits or light absorption plates that are arranged at regular intervals along a circumferential direction of the rotation panel, and the rotation detection unit may include a light source and a light reception unit.

The one or more location detection devices may include permanent magnets that have an N pole and an S pole and are alternately arranged along a circumferential direction of the rotation panel, and the rotation detection unit may include a magnetic flux sensor.

The one or more location detection devices may include permanent magnets that have an N pole and an S pole and are alternately arranged along a circumferential direction of the rotation panel, and the rotation detection unit may include coils arranged along a circumferential direction of the rotor shaft.

The DC motor may further include a FPCB facing the cover unit and arranged on the end cover. The one or more location detection devices may include one or more protrusions that are arranged on a surface of the rotation panel along a circumferential direction of the cover unit and formed of conductors, and the rotation detection unit may include one or more metal members that are spaced apart from each other on the FPCB along a circumferential direction of the rotor shaft and generate a capacitance together with the one or more protrusions.

The one or more location detection devices may include one or more protrusions that are arranged on a surface of the rotation panel along a circumferential direction of the cover unit and formed of conductors, and the rotation detection unit may include one or more coils that are spaced apart from each other on the FPCB along a circumferential direction of the rotor shaft and generate an inductance together with the one or more protrusions.

The one or more location detection devices may include one or more materials that have different permittivities and are arranged on a surface of the rotation panel along a circumferential direction of the cover unit, and the rotation detection unit may include one or more coils that are spaced apart from each other on the FPCB along a circumferential direction of the rotor shaft and generate a capacitance together with the materials having the different permittivities.

The one or more location detection devices may include metallic and non-metallic materials that are arranged on a surface of the rotation panel along a circumferential direction of the cover unit, and the rotation detection unit may include one or more coils that are spaced apart from each other on the FPCB along a circumferential direction of the rotor shaft and generate an inductance together with the metallic and non-metallic materials.

According various embodiments, when the rotation detection unit and the location detection device are installed in a main body of the DC motor, it is unnecessary to secure an additional space where the rotation detection unit and the location detection device are to be arranged, and thus, a size of a product may be reduced. Also, design of the product may be simplified due to the modularization of a motor driving unit, and also, a structure of a gear box unit configured to transmit power may be simplified by installing the rotation detection unit in the main body of the DC motor. Also, an amount of effort involved in assembly is reduced, and manufacturing costs may be decreased because motor manufacturers may assemble sensor units more easily.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
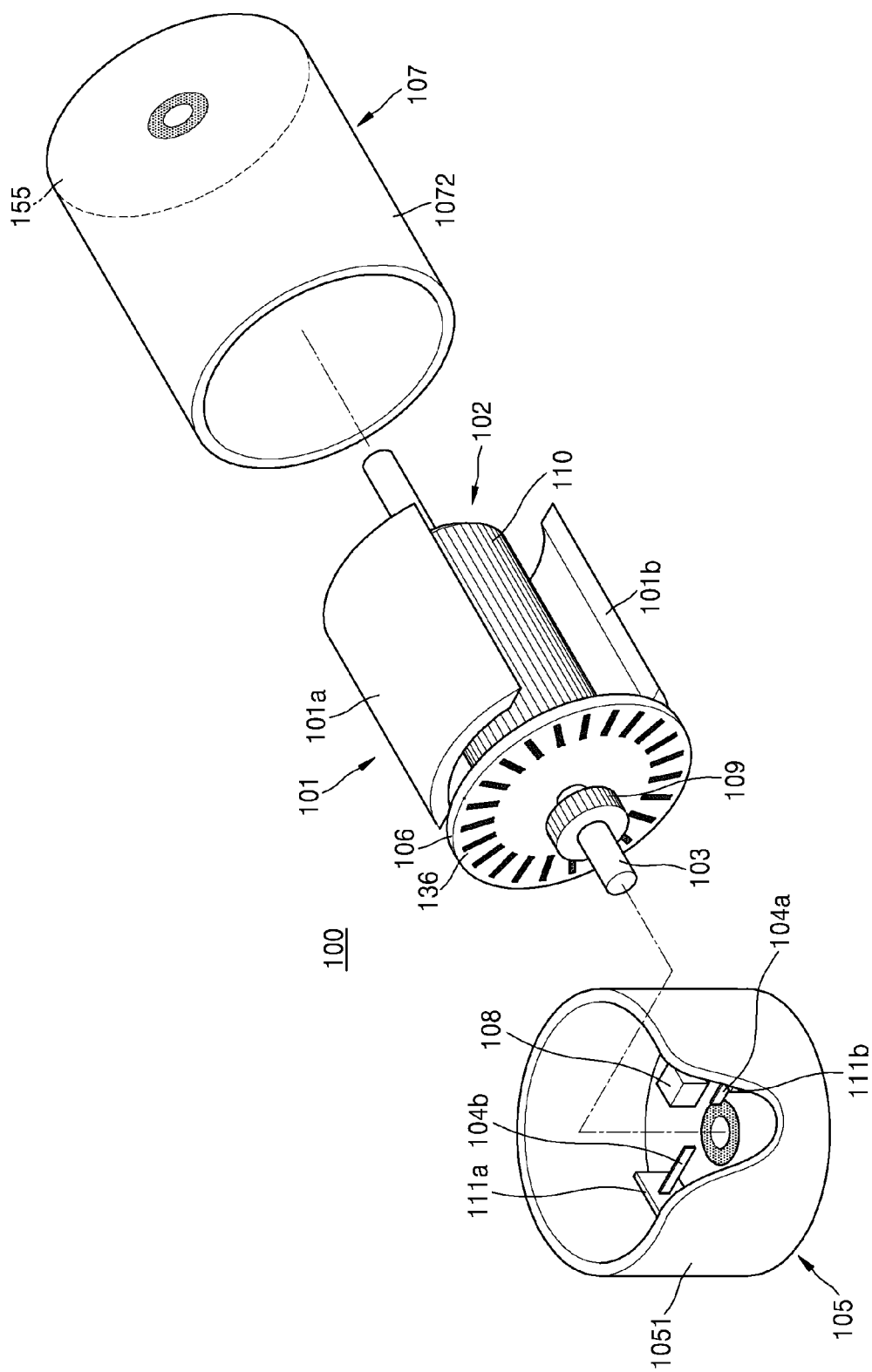
FIG. 1 is a perspective view of a DC motor according to an embodiment.

Hereinafter, various embodiments will be described with reference to the attached drawings. Like reference numerals in the drawings denote like elements.

FIG. 1 is a perspective view of a DC motor 100 according to an embodiment.

Referring to FIG. 1, the DC motor 100 includes a stator 101, a frame 107, a rotor 102, and a pair of brushes 104a and 104b. The stator 101 includes a plurality of fixed magnets, for example a pair of fixed magnets 101a and 101b, which have opposite poles and may maintain a magnetic field. The fixed magnets 101a and 101b may be fixed on, for example, an inner surface of the frame 107. The frame 107 may be a cylindrical shape, an end portion of which is open and includes an external wall 1072 and an end plate 155, and the open end portion may be blocked by an end cover 105. The rotor 102 includes a rotor shaft 103, a rotor core 110 that is arranged between the fixed magnets 101a and 101b, generates a magnetomotive force by receiving a current, and has coils wound around it, and a commutator 109 that contacts the brushes 104a and 104b and transmits a current to coils. The rotor shaft 103 may be rotated by the rotor core 110 and is supported by an end cover 105 and the frame 107. The commutator 109 is arranged on the rotor shaft 103 and may rotate along with the rotor shaft 103. The cover unit 106 is arranged between the rotor core 110 and the commutator 109, may rotate along with the rotor shaft 103, and may fix the coils wound around the rotor core 110. The brushes 104a and 104b are respectively supported by brush holders 111a and 111b, are arranged in the end cover 105, and may transmit a current to the coils by contacting the commutator 109. The DC motor 100 further includes one or more location detection devices, represented in FIG. 1 by location detection devices 136.

Figure 2A:
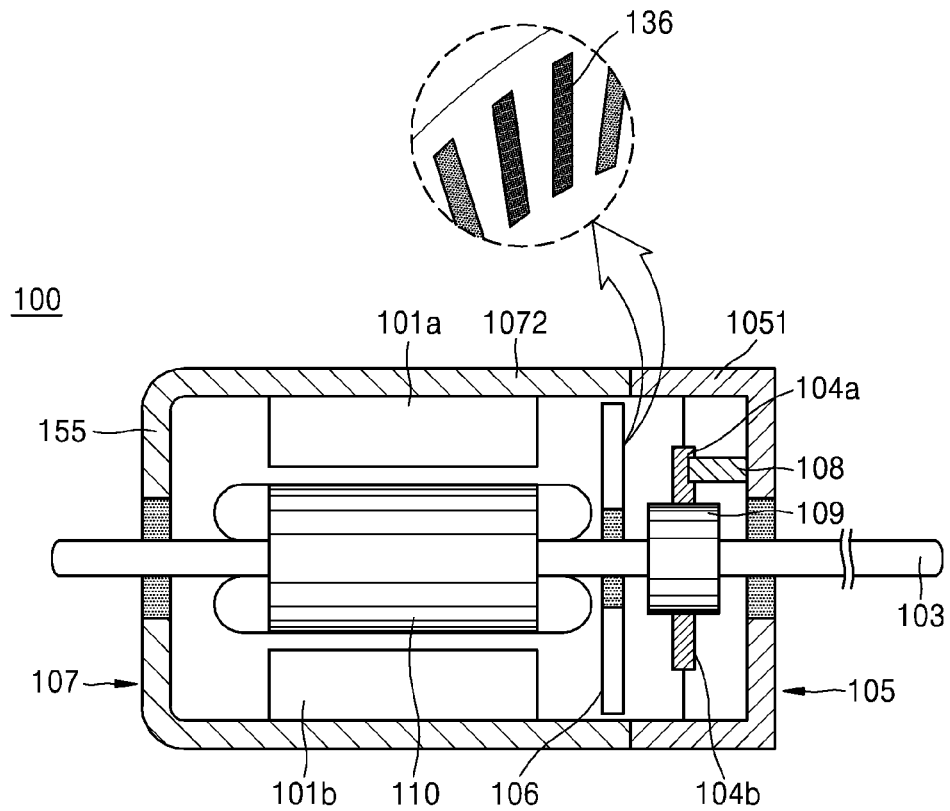
FIGS. 2A to 2C are cross-sectional views of a DC motor including a cover unit on which a location detection device is disposed, according to various embodiments.
Figure 2B:
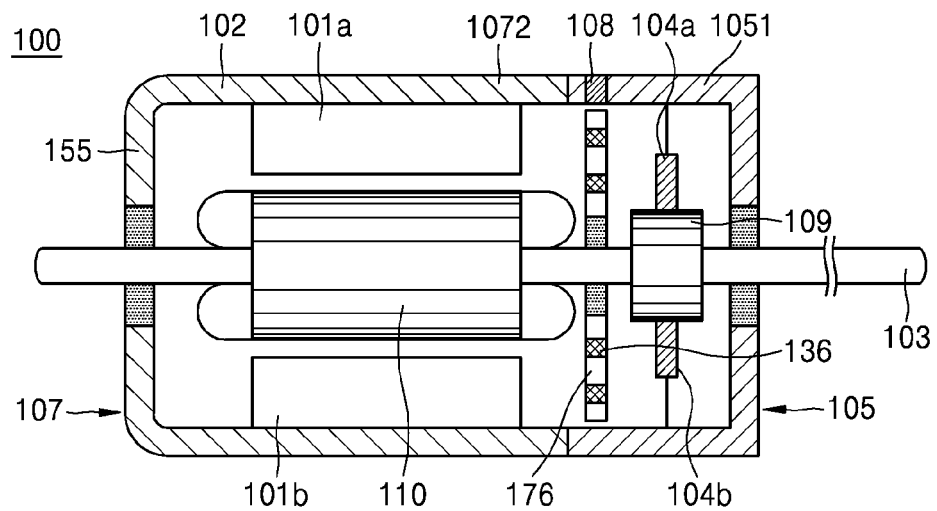
Figure 2C:
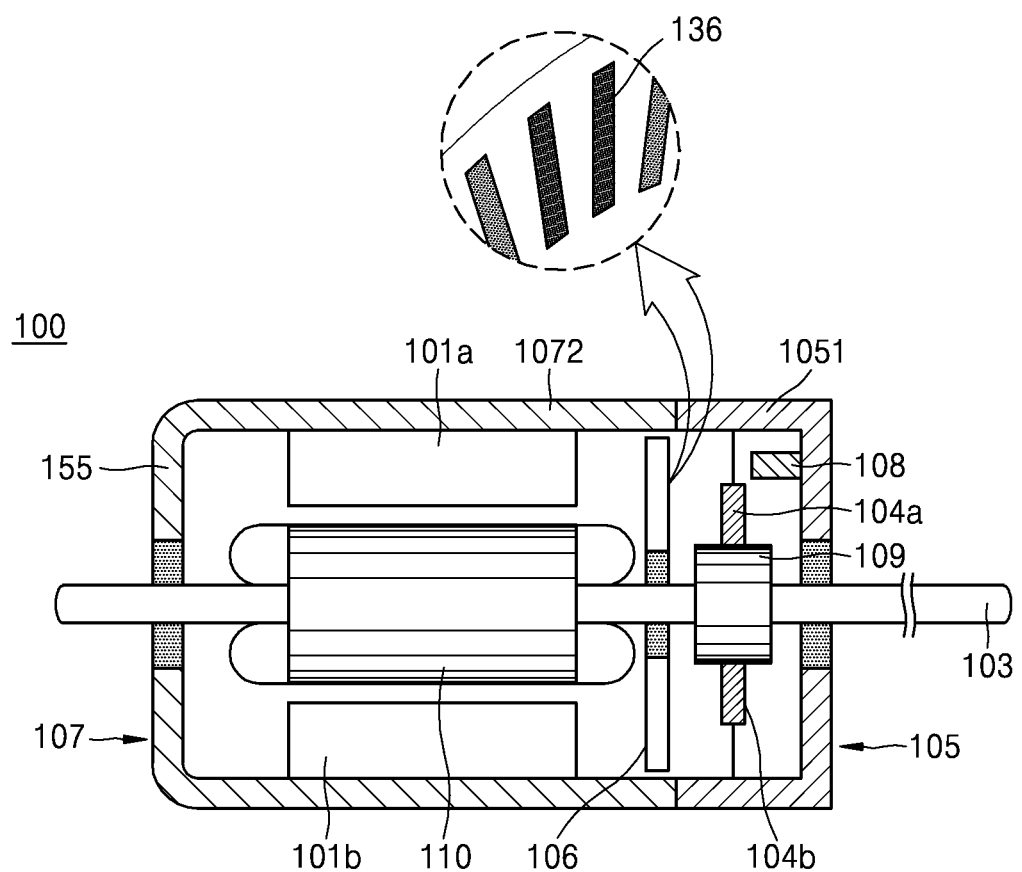
Figure 3A:
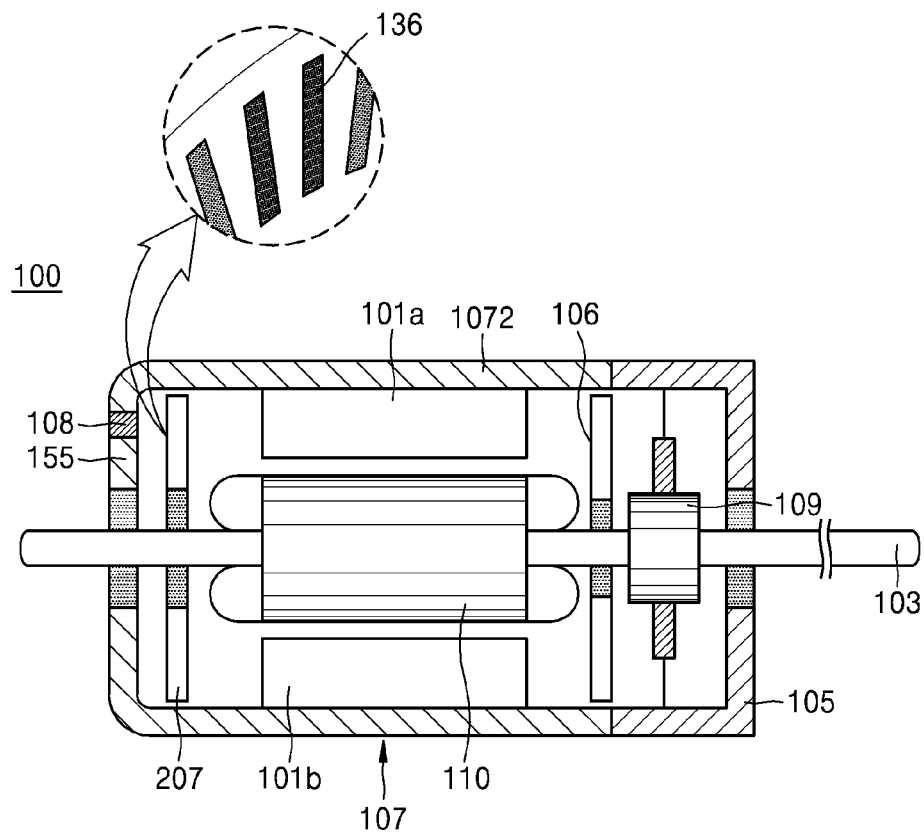
FIGS. 3A and 3B are cross-sectional views of a DC motor including a rotation panel on which a location detection device is disposed, according to various embodiments.
Figure 3B:
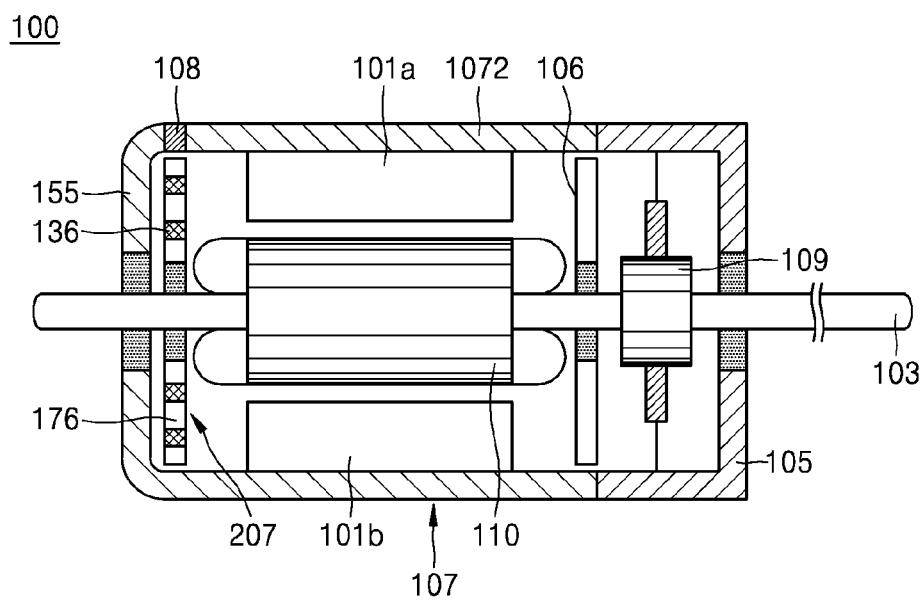

FIG. 2A to 2C are cross-sectional views of the DC motor 100 including the cover unit 106 on which the location detection devices 136 are disposed, according to various embodiments, and FIGS. 3A and 3B are cross-sectional views of the DC motor 100 including a rotation panel 207 on which the location detection devices 136 are disposed, according to various embodiments.

As noted above, and as shown in FIGS. 2A to 3B, the location detection devices 136 may be arranged on the cover unit 106 or the rotation panel 207. The location detection devices 136 may transmit location signals to a rotation detection unit 108 to be described below, as the cover unit 106 or the rotation panel 207 rotates, and may be, for example, a reflector, a permanent magnet, or the like.

The rotation detection unit 108 is configured to detect a rotation velocity of the cover unit 106 or the rotation panel 207 by using location signals transmitted by the location detection devices 136 that are arranged on the cover unit 106 or the rotation panel 207, and a rotation velocity of the rotor shaft 103, that is, a rotation velocity of the DC motor 100 may be detected by the rotation detection unit 108. An output form of a detected rotation velocity may be a pulse or sine-wave form and may be determined by a circuit unit. Thus, a plurality of rotation detection units 108 may also be used to detect a rotation direction or improve the accuracy of detection (resolving power). The number of the rotation detection units 108 arranged in the DC motor 100 may be determined in accordance with manufacturing costs, accuracy, or the like.

Referring to FIGS. 1 and 2A, the rotation detection unit 108 may be arranged in an area formed between the first brush 104a and the second brush 104b along a circumferential direction of the rotor shaft 103. In an embodiment, the location detection devices 136 are arranged on a surface of the cover unit 106, which faces the rotation detection unit 108, at regular intervals along the circumferential direction. The other surface of the cover unit 106, on which the location detection devices 136 are not arranged, may be coupled to the coils wound around the rotor core 110 and may fix the same. Referring to FIG. 2C, possible locations of the rotation detection unit 108 are not limited to an area formed between the first brush 104a and the second brush 104b along the circumferential direction of the rotor shaft 103. For example, the rotation detection unit 108 may be arranged on an area formed between the first brush 104a and an external wall 1051 of the end cover 105 or an area formed between the second brush 104b and the external wall 1051 of the end cover 105. Also, a plurality of rotation detection units 108 may be arranged on areas formed between the first brush 104a and the external wall 1051 of the end cover 105, between the second brush 104b and the external wall 1051 of the end cover 105, and between the first brush 104a and the second brush 104b along the circumferential direction of the rotor shaft 103 in order to detect a rotation direction or improve the accuracy of detection (resolving power).

When the DC motor 100 operates according to an embodiment, the rotor shaft 103 is rotated by the rotor core 110, and the cover unit 106 (arranged on the rotor shaft 103) also rotates. In this case, as the cover unit 106 rotates, the location detection devices 136 arranged on a surface of the cover unit 106 may also rotate. As the location detection devices 136 rotate, periodical signals may be transmitted to the rotation detection unit 108, which is arranged to face the location detection devices 136. A rotation direction or velocity of the DC motor 100 may be detected by detecting the rotation of the cover unit 106 by using the periodical signals transmitted to the rotation detection unit 108.

Referring to FIG. 2B, according to an embodiment, the rotation detection unit 108 is inserted into the external wall 1051 of the end cover 105, and the location detection devices 136 are arranged at regular intervals along a side portion 176 of the cover unit 106. In this case, the rotation detection unit 108 may be arranged along a diameter direction of the rotor shaft 103. For example, the rotation detection unit 108 may be arranged in an entire portion of the external wall 1051 of the end cover 105 that faces the location detection devices 136.

When the DC motor 100 operates according to an embodiment, the rotor shaft 103 is rotated by the rotor core 110, and the cover unit 106 that is arranged on the rotor shaft 103 also rotates. In this case, as the cover unit 106 rotates, the periodical signals may be transmitted from the location detection devices 136 arranged on the side portion 176 of the cover unit 106 to the rotation detection unit 108 arranged to face the location detection devices 136. As described above, the rotation of the DC motor 100 may be detected by using the periodical signals transmitted to the rotation detection unit 108.

As described above, the rotation detection unit 108 is arranged in the DC motor 100 and the location detection devices 136 are arranged on the cover unit 106. Thus, it may be unnecessary to secure additional space for arranging a rotation plate on which the rotation detection unit 108 (which measures a rotation velocity of the DC motor 100) and the location detection devices 136 are arranged. This allows a product including the DC motor 100 to be reduced in size because, although the size of the DC motor 100 remains the same, the space needed to arrange the rotation detection unit 108, etc. is reduced. Also, if the motor driving unit is modularized, design of the DC motor 100 may be simplified, and external components driven by the DC motor 100 (for example, a structure of a gear box) may be simplified. In addition, the amount of effort involved in assembly may be reduced, thus reducing manufacturing costs.

Referring to FIG. 3A, according to an embodiment, the rotation panel 207 is installed on the rotor shaft 103 and is additionally arranged on the other end of the rotor core 110 on which the commutator 109 is not arranged. The rotation detection unit 108 is inserted into the end plate 155, and the location detection devices 136 are arranged on a surface of the rotation panel 207, which faces the rotation detection unit 108, at regular intervals along a circumferential direction. In this case, the rotation detection unit 108 may be inserted into an entire portion of the end plate 155 that faces the location detection devices 136.

A method of measuring a rotation velocity of the DC motor 100 by using the location detection devices 136 arranged on a surface of the rotation panel 207 and the rotation detection unit 108 is the same as the description provided with reference to FIG. 2A, and thus, descriptions regarding the method will not be repeated here.

Referring to FIG. 3B, the rotation panel 207 is installed on the rotor shaft 103 and is arranged on the other end of the rotor core 110 on which the commutator 109 is not arranged. The rotation detection unit 108 is inserted into the external wall 1072 of the frame 107, and the location detection devices 136 are arranged at regular intervals along the side portion 176 of the rotation panel 207 that faces the rotation detection unit 108. In this case, the rotation detection unit 108 may be arranged along a diameter direction of the rotor shaft 103. For example, the rotation detection unit 108 may be inserted into an entire portion of the external wall 1072 of the frame 107 that faces the location detection devices 136.

A method of measuring a rotation velocity of the DC motor 100 by using the location detection devices 136 arranged on the side portion 176 of the rotation panel 207 and the rotation detection unit 108 is the same as the description provided with reference to FIG. 2B, and thus, descriptions regarding the method will not be repeated here.

In comparison with the DC motor 100 of FIG. 2A to 2C, the volume of the DC motor 100 of FIGS. 3A and 3B may be greater according to the thickness of the rotation panel 207 because the rotation panel 207 is additionally arranged on the other end of the rotor core 110, that is, an opposite surface of the commutator 109. However, the location detection devices 136 may be densely arranged along a circumferential direction of the rotation panel 207 as the rotation panel 207 is arranged on the other end of the rotor core 110. Accordingly, the rotation of the DC motor 100 may be accurately detected as the resolving power of the rotation detection unit 108 is improved.

Hereinafter, a method of detecting the rotation of the cover unit 106 and the rotation panel 207 by using the location detection devices 136 and the rotation detection unit 108 arranged in the DC motor 100 according to an embodiment will be described. Because the methods of detecting the rotation of the DC motor 100 of FIGS. 2A to 3B may be identical (except for the arrangement of the cover unit 106, the rotation panel 207, and the rotation detection unit 108), the method of detecting the rotation of the DC motor 100 will be described in detail on the basis of the DC motor 100 of FIG. 2A. It is to be understood, however, that the method may also be used for the embodiments of FIGS. 2B-3C.

Figure 4A:
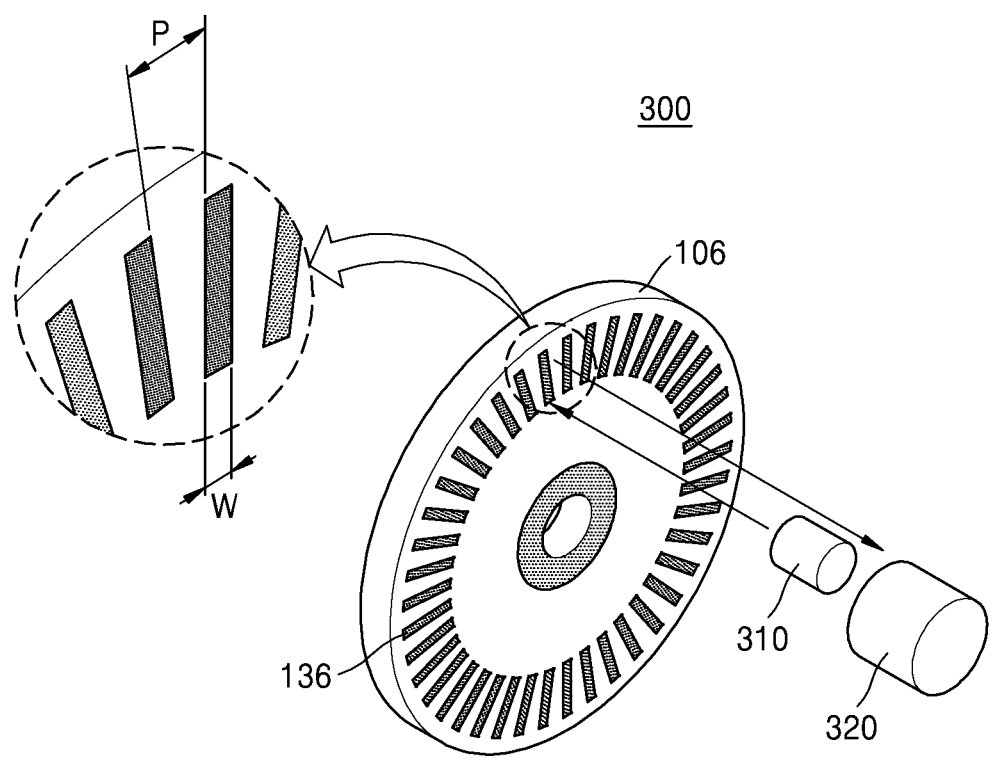
FIG. 4A is a partial perspective view of an optical encoder for detecting rotation of a cover unit, according to an embodiment.
Figure 4B:
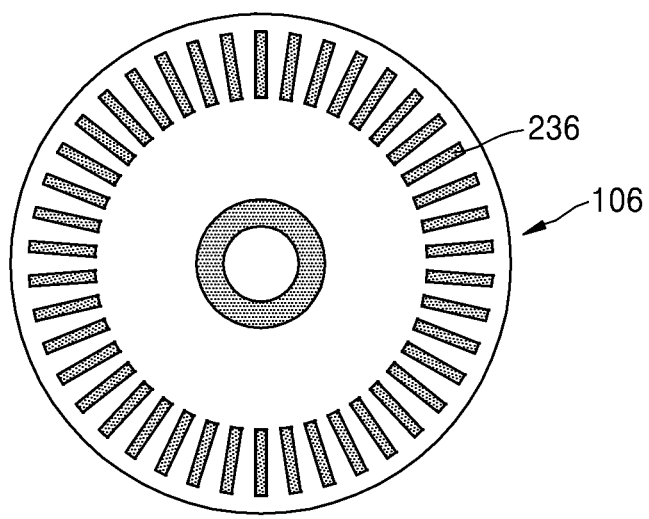
FIGS. 4B and 4C are front views of a cover unit on which a location detection device used for an optical encoder is formed as a reflector or a slit.
Figure 4C:
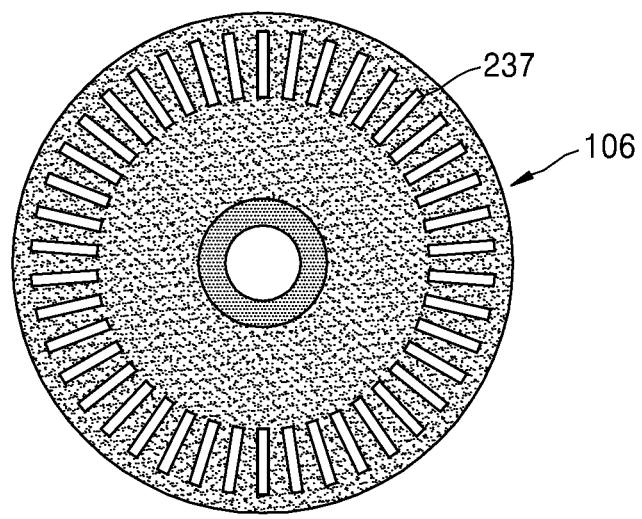

FIG. 4A is a partial perspective view of an optical encoder 300 for detecting rotation of the cover unit 106, according to an embodiment, and FIGS. 4B and 4C are front views of the cover unit 106 on which the location detection devices 136 used for the optical encoder 300 are formed as reflectors 236 or slits 237.

Referring to FIG. 4A, the optical encoder 300 according to an embodiment includes a cover unit 106 and a rotation detection unit 108 including a light source 310 and a light reception unit 320. One or more location detection devices 136 having the same width w may be arranged on a surface of the cover unit 106 at intervals of the same pitch p along the circumferential direction of the cover unit 106. The light source 310 may be implemented as any of a variety of light-emitting devices such as light-emitting diodes (LEDs) and may emit light to the cover unit 106. The light reception unit 320 may be, for example, a photo diode, a photo transistor, a photo resistor, or the like, and light reflected from the cover unit 106 may be incident on the light reception unit 320.

Referring to FIGS. 4A and 4B, the location detection devices 136 according to an embodiment may be formed as reflectors 236 arranged along the circumferential direction of the cover unit 106. As described above, the rotor shaft 130 rotates as the DC motor 100 operates, and thus, the cover unit 106 is also rotated by the rotor shaft 130. In this case, the location detection devices 136 arranged on the surface, that is, the reflectors 236, also rotate, and the light emitted by the light source 310 is reflected from the reflectors 236 and may be incident to the light reception unit 320. As the light is incident on the light reception unit 320, output signals are generated in a light reception area of the light reception unit 320, and electrodes (not shown) connected to the light reception area transmit the output signals to the outside. Therefore, the rotation of the cover unit 106 may be detected.

Referring to FIGS. 4A and 4C, the location detection devices 136 according to an embodiment may be formed as slits 237 arranged along the circumferential direction of the cover unit 106. In this case, the cover unit 106 may be formed of materials that have good reflectivity, and the light emitted by the light source 310 is reflected from areas except for the slits 237 and is incident on the light reception unit 320. Thus, the output signals may be generated, and the rotation of the cover unit 106 may be detected.

Figure 5:
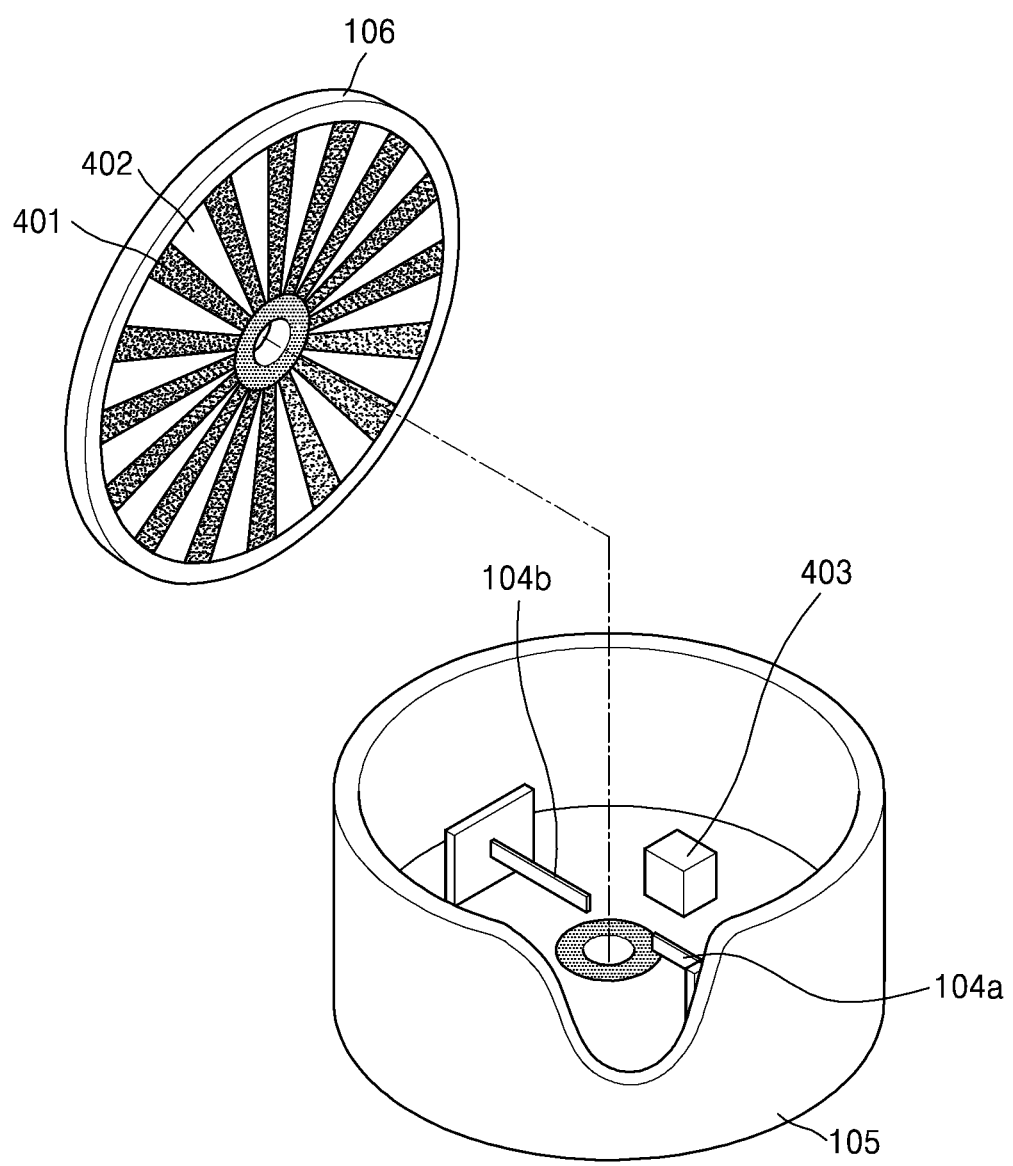
FIG. 5 is a partial perspective view of a magnetic encoder including a magnetic flux sensor in order to detect rotation of a cover unit, according to an embodiment.

FIG. 5 is a partial perspective view of a magnetic encoder to detect rotation of the cover unit 106, according to an embodiment.

Referring to FIG. 5, the magnetic encoder according to an embodiment includes the cover unit 106 and a rotation detection unit 108 including a magnetic flux sensor 403. Permanent magnets 401 and 402 having opposite poles are alternately disposed on the cover unit 106 along the circumferential direction of the cover unit 106. In this case, the permanent magnets 401 and 402 may be integrally formed where half of the cover unit 106 is an N pole 401 and the other half of the cover unit 106 is an S pole 402, or may be independent permanent magnets arranged at regular intervals along a circumference. The magnetic flux sensor 403 detects a magnetic flux interlinkage with respect to the permanent magnets 401 and 402, wherein the magnetic flux interlinkage regularly changes in accordance with the rotation of the cover unit 106 while the DC motor 100 operates, and the magnetic flux sensor 403 may output the detected magnetic flux interlinkage as electrical signals. Then, output signals are transmitted to a predetermined signal processor (not shown), and the rotation of the DC motor 100 may be detected thereby. The magnetic flux sensor 403 according to an embodiment may be a Hall sensor or a magneto resistive (MR) sensor.

Figure 6:
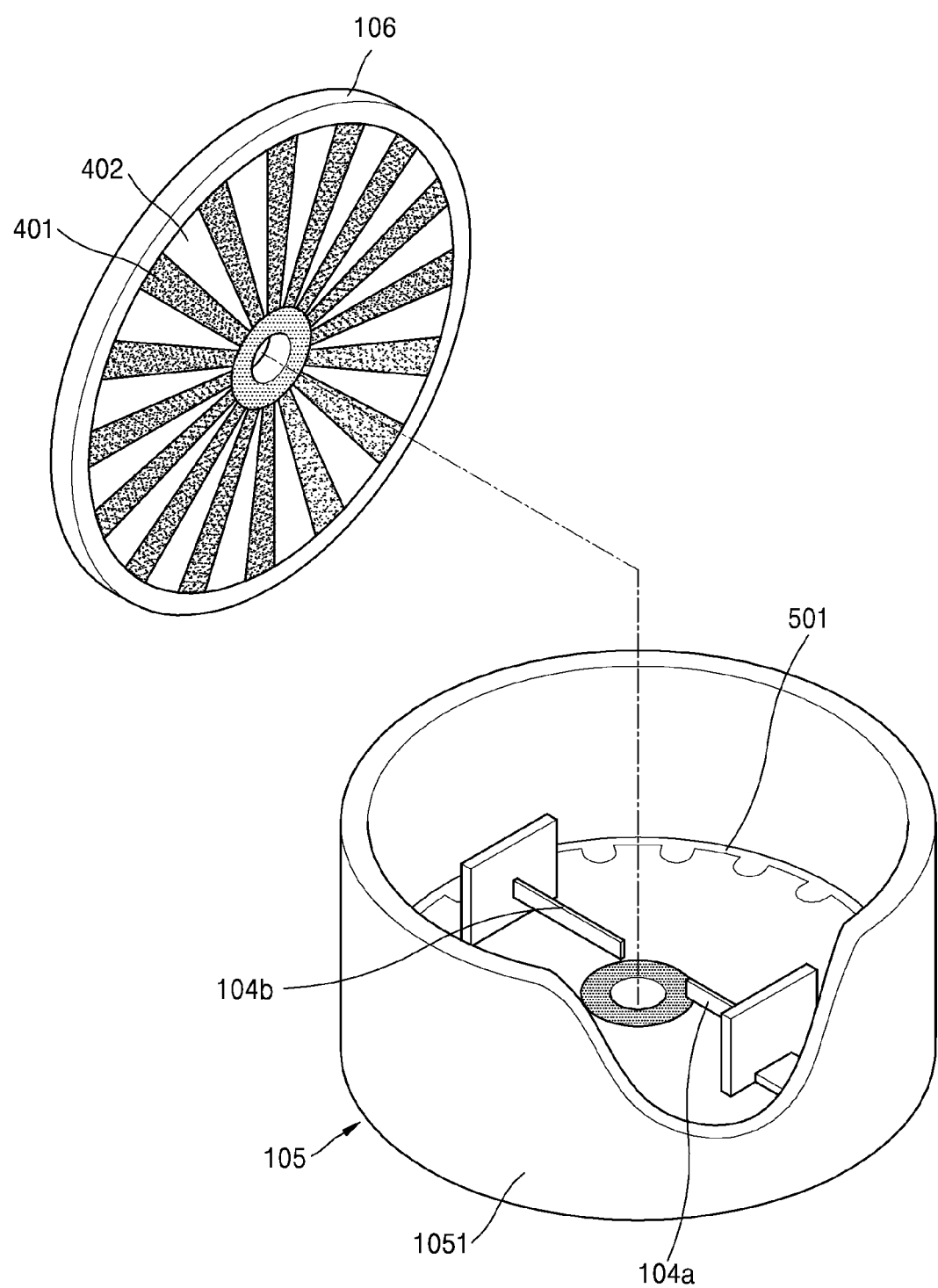
FIG. 6 is a partial perspective view of a DC motor including coils instead of a magnetic flux sensor in order to detect rotation of a cover unit, according to an embodiment.

FIG. 6 is a partial perspective view of a magnetic encoder including coils 501 instead of the magnetic flux sensor 403 in order to detect rotation of the cover unit 106, according to an embodiment.

Referring to FIG. 6, the magnetic encoder according to an embodiment includes the cover unit 106 to which the permanent magnets 401 and 402 are coupled, and the coils 501. The permanent magnets 401 and 402 having opposite poles are alternately coupled to the cover unit 106 along the circumferential direction of the cover unit 106. In this case, as described above, the permanent magnets 401 and 402 may be integrally formed or may be independent permanent magnets. The coils 501 are arranged between the brushes 104a and 104b and the external wall 1051 of the end cover 105 along a circumferential direction. As the cover unit 106 rotates while the DC motor 100 operates, a magnetic field formed by the permanent magnets 401 and 402 regularly changes, and thus, electrical signals generated by an induced current may be output to the coils 501. The electrical signals are transmitted to the predetermined signal processor (not shown), and the rotation of the DC motor 100 may be detected thereby.

Figure 7A:
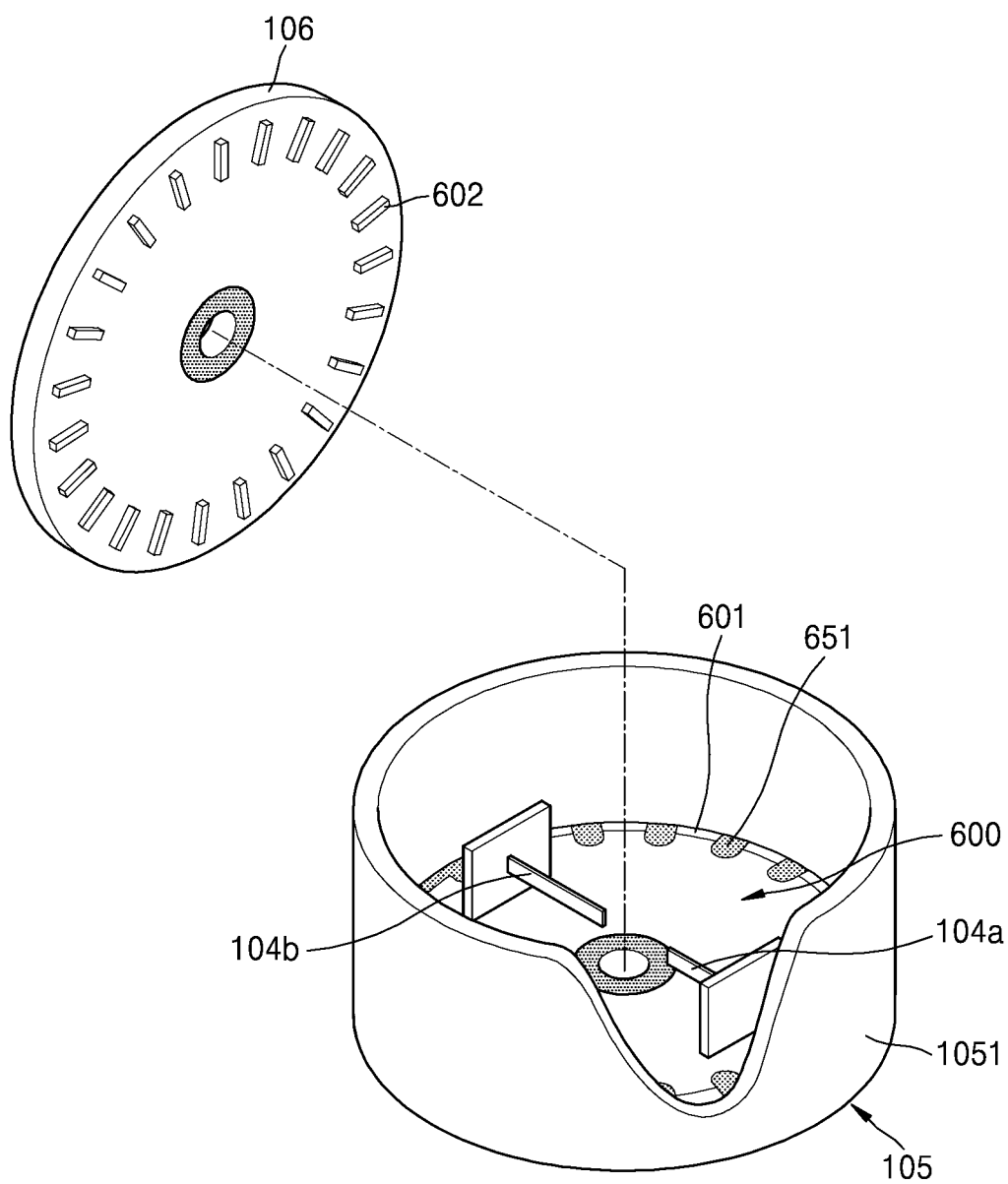
FIGS. 7A and 8A are partial perspective views of a DC motor including a FPCB in order to measure a rotation velocity of a cover unit including a plurality of protrusions, according to various embodiments.
Figure 7B:
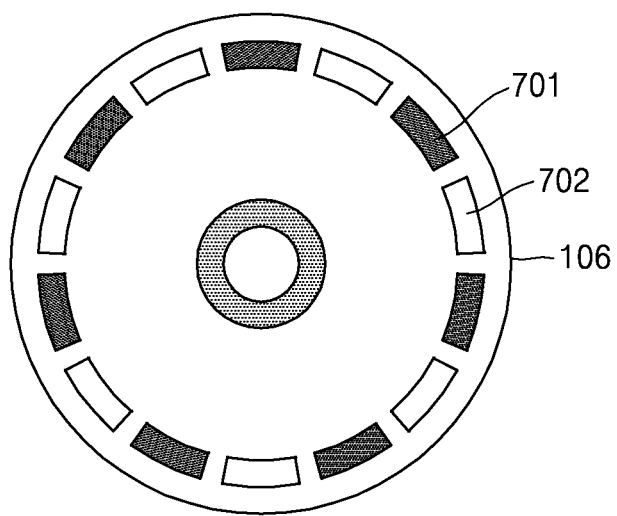
FIG. 7B is a front view of a cover unit in which different dielectric substances are alternately arranged.
Figure 8A:
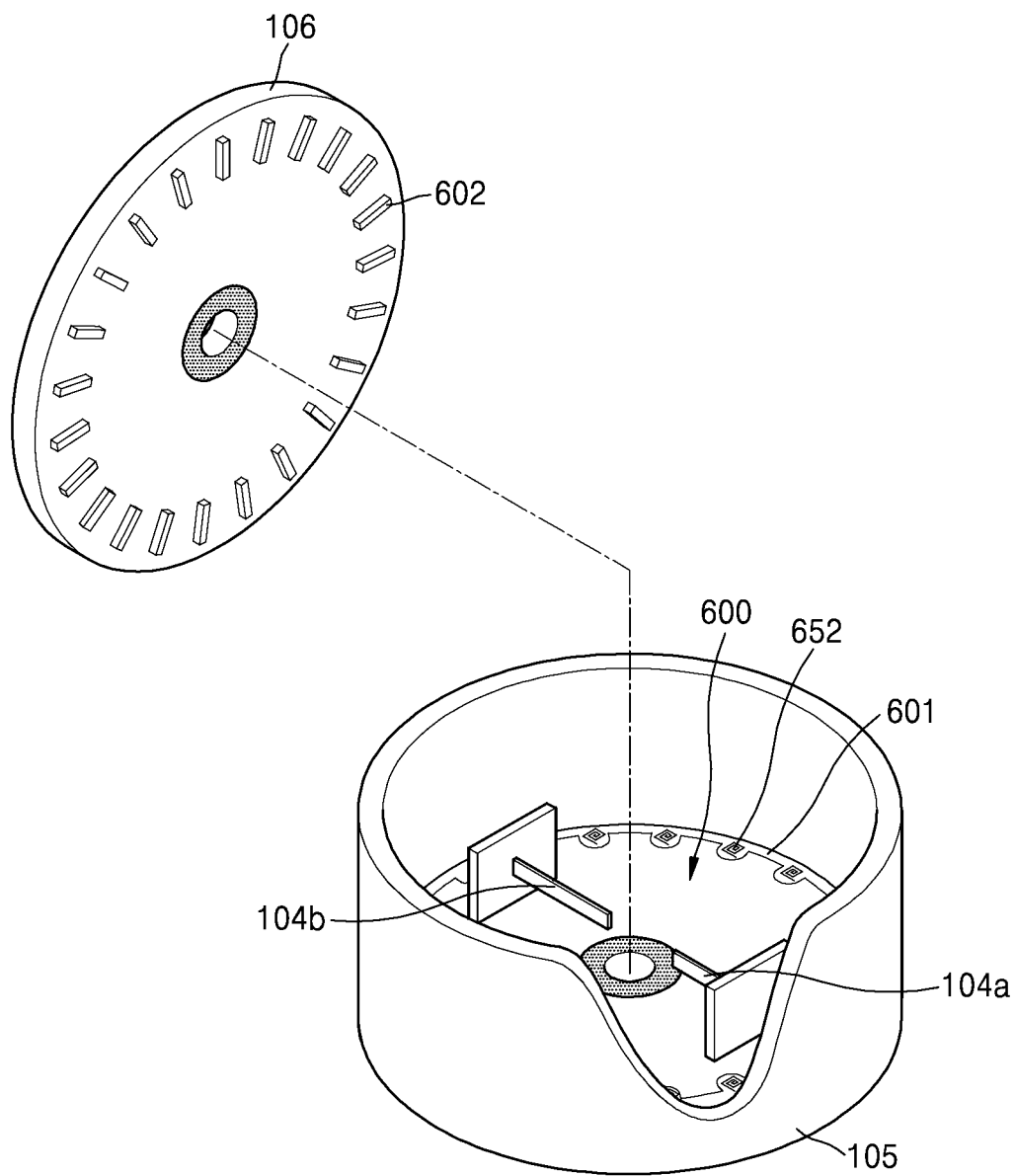

FIGS. 7A and 8A illustrate a flexible FPCB 600 in which a detection pattern 601 is formed instead of the rotation detection unit 108 in order to measure a rotation velocity of the cover unit 106, according to various embodiments. FIG. 7B is a front view of a cover unit in which different dielectric substances are alternately arranged, and FIG. 8B is a front view of a cover unit in which metallic and non-metallic materials are alternately arranged.

Referring to FIGS. 7A and 8A, a plurality of protrusions 602 formed of conductors having conductivity are arranged at regular intervals along the circumferential direction of the cover unit 106. The ring-shaped FPCB 600 is arranged between the brushes 104a and 104b and the external wall 1051 of the end cover 105, and the detection pattern 601 is circularly arranged on the FPCB 600 to be opposite to the protrusions 602. Signals having a frequency corresponding to half the number of protrusions 602 are generated whenever the FPCB 600 rotates through one complete revolution, and passive elements such as coils 652 of an inductance sensor, or metal members 651 of a capacitance sensor are arranged on the detection pattern 601. As the detection pattern 601 faces the protrusions 602, an inductance or capacitance having constant intensity may be generated. As the cover unit 106 rotates while the DC motor 100 operates, the protrusions 602 (formed of conductors having conductivity) may be arranged on the detection pattern 601, and in this case, a capacitance generated between the protrusions 602 and the metal members 651 or an inductance generated between the protrusions 602 and the coils 652 may be regularly detected. A change of the capacitance or inductance is output as electrical signals, and thus, the rotation of the DC motor 100 may be detected.

Referring to FIG. 7B, first and second materials 701 and 702 having different permittivities are alternately arranged along the circumferential direction of the cover unit 106. As described above, the metal members 651 of the capacitance sensor may be arranged on the detection pattern 601 of the FPCB 600. As the cover unit 106 rotates while the DC motor 100 operates, the first and second materials 701 and 702 having different permittivities may be alternately arranged on the detection pattern 601, and in this case, a difference between capacitances is detected in accordance with materials arranged on the detection pattern 601. Thus, a difference between permittivities of the first material 701 and the second material 702 may be detected. The difference between the permittivities is output as electrical signals, and thus, the rotation of the DC motor 100 may be detected.

Figure 8B:
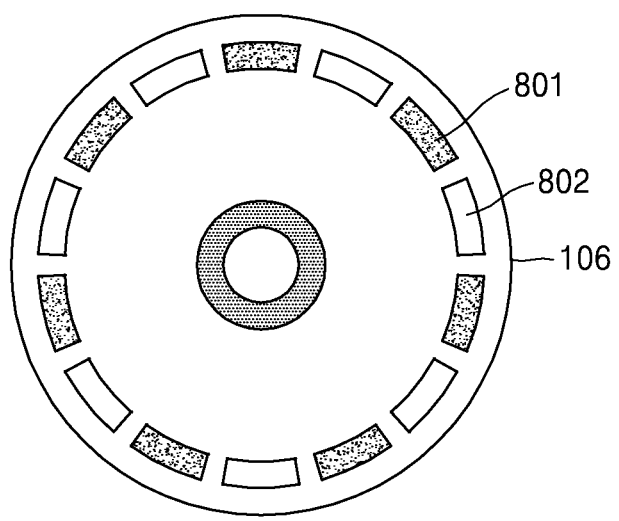
FIG. 8B is a front view of a cover unit in which metallic and non-metallic materials are alternately arranged.

Referring to FIG. 8B, metallic and non-metallic materials 801 and 802 are alternately arranged along the circumferential direction of the cover unit 106. As described above, the coils 652 of the inductance sensor may be arranged on the detection pattern 601 of the FPCB 600. As the cover unit 106 rotates while the DC motor 100 operates, the metallic and non-metallic materials 801 and 802 may be alternately arranged on the detection pattern 601, and in this case, a difference between inductances is detected in accordance with a difference between the first material 701 and the second material 702 which are arranged on the detection pattern 601, and thus, a conductivity difference may be detected. The conductivity difference is output as electrical signals, and thus, the rotation of the DC motor 100 may be detected.

It should be understood that the embodiments described herein should be considered in a descriptive sense only and not for purposes of limitation. Descriptions of features or aspects within each embodiment should typically be considered as available for other similar features or aspects in other embodiments.

While various embodiments have been described with reference to the figures, it will be understood by those of ordinary skill in the art that various changes in form and details may be made therein without departing from the spirit and scope as defined by the following claims.

The use of the terms "a", "an", and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the invention and does not pose a limitation on the scope of the disclosure unless otherwise claimed. Numerous modifications and adaptations will be readily apparent to one of ordinary skill in the art without departing from the spirit and scope of the disclosure.

What is claimed is:

1. A direct current (DC) motor comprising:
   a cylindrical frame, at least one end of which is open;
   a cylindrical end cover including an opening configured to block the at least one open end;
   a rotor comprising
      a rotor shaft supported by the cylindrical frame and the cylindrical end cover, and
      a rotor core installed on the rotor shaft;
   a commutator installed on the rotor shaft and arranged on one end of the rotor core;
   a cover unit installed on the rotor shaft, arranged between the rotor and the commutator, and comprising at least one location detection device; and
   a rotation detection unit installed in the cylindrical end cover and configured to detect the at least one location detection device;
   further comprising a flexible printed circuit board facing the cover unit and arranged on the end cover, wherein
   the at least one location detection device comprises one or more protrusions formed of conductors and arranged on a surface of the cover unit along a circumferential direction of the cover unit or comprises materials having different permittivities and alternately arranged along the circumferential direction of the cover unit, and
   the rotation detection unit comprises one or more metal members that are spaced apart from each other on the flexible printed circuit board along a circumferential direction of the rotor shaft and generate a capacitance together with the one or more protrusions or the materials having different permittivities.

2. The DC motor of claim 1, wherein
   the DC motor comprises a plurality of brushes supported by the end cover, contacting the commutator, and spaced apart from each other along a circumferential direction of the rotor shaft, and
   the rotation detection unit is arranged between the pair of brushes along the circumferential direction of the rotor shaft.

3. The DC motor of claim 1, wherein the DC motor comprises:
   a commutator installed on the rotor shaft and arranged on one end of the rotor core; and
   a pair of brushes supported by the end cover, contacting the commutator, and spaced apart from each other along a circumferential direction of the rotor shaft,
   wherein the rotation detection unit is arranged between an external wall of the end cover and any one of the pair of brushes, along a diameter direction of the rotor shaft.

4. The DC motor of claim 2, wherein
   the at least one location detection device is arranged along a side portion of the cover unit, and
   the rotation detection unit is inserted into an external wall of the end cover along a diameter direction of the rotor shaft.

5. The DC motor of claim 2, further comprising one or more rotation detection units.

6. The DC motor of claim 2, wherein
   the at least one location detection device comprises one or more reflectors arranged at regular intervals along a circumferential direction of the cover unit, and
   the rotation detection unit comprises a light source and a light reception unit.

7. The DC motor of claim 2, wherein
   the at least one location detection device comprises one or more slits arranged at regular intervals along a circumferential direction of the cover unit, and
   the rotation detection unit comprises a light source and a light reception unit.

8. The DC motor of claim 2, wherein
   the at least one location detection device comprises permanent magnets that have an N pole and an S pole and are alternately arranged along a circumferential direction of the cover unit, and
   the rotation detection unit comprises a magnetic flux sensor.

9. The DC motor of claim 1, wherein
   the at least one location detection device comprises permanent magnets that have an N pole and an S pole and are alternately arranged along a circumferential direction of the cover unit, and
   the rotation detection unit comprises coils that are arranged along a circumferential direction of the rotor shaft.

10. A direct current (DC) motor comprising:
    a cylindrical frame, at least one end of which is open;
    a cylindrical end cover including an opening configured to block the at least one open end;
    a rotor comprising
       a rotor shaft supported by the cylindrical frame and the cylindrical end cover, and
       a rotor core installed on the rotor shaft;
    a commutator installed on the rotor shaft and arranged on one end of the rotor core;
    a cover unit installed on the rotor shaft, arranged between the rotor and the commutator, and comprising at least one location detection device;
    a rotation detection unit installed in the cylindrical end cover and configured to detect the at least one location detection device; and
    a flexible printed circuit board facing the cover unit and arranged on the end cover, wherein
    the at least one location detection device comprises one or more protrusions formed of conductors and arranged on a surface of the cover unit along a circumferential direction of the cover unit or comprises metallic and non-metallic materials alternately arranged along the circumferential direction of the cover unit, and
    the rotation detection unit comprises one or more coils that are spaced apart from each other on the flexible printed circuit board along a circumferential direction of the rotor shaft and generate an inductance together with the one or more protrusions or metallic and non-metallic materials.

11. A direct current (DC) motor comprising:
    a cylindrical frame, at least one end of which is open;
    a cylindrical end cover including an opening configured to block the at least one open end;
    a rotor comprising
       a rotor shaft supported by the cylindrical frame and the cylindrical end cover, and
       a rotor core installed on the rotor shaft;
    a commutator installed on the rotor shaft and arranged on one end of the rotor core;
    a cover unit installed on the rotor shaft and arranged between the rotor and the commutator;
    a rotation panel arranged between an end plate of the frame and the other end of the rotor core which is opposite to the one end of the rotor and comprising one or more location detection devices, wherein the commutator is arranged on the one end of the rotor core;

a rotation detection unit installed in the frame and configured to detect the one or more location detection devices; and a flexible printed circuit board facing the cover unit and arranged on the end cover; wherein the one or more location detection devices comprise metallic and non-metallic materials or one or more protrusions formed of conductors that are arranged on the surface of the rotation panel along the circumferential direction of the cover unit, and the rotation detection unit comprises one or more coils that are spaced apart from each other on the flexible printed circuit board along a circumferential direction of the rotor shaft and generate an inductance together with the metallic and non-metallic materials or one or more protrusions.

12. The DC motor of claim 11, wherein the one or more location detection devices are arranged on a surface of the rotation panel, which faces the rotation detection unit, along a circumferential direction of the rotation panel, and the rotation detection unit is inserted into the end plate of the frame.

13. The DC motor of claim 11, wherein the one or more location detection devices are arranged along a side portion of the rotation panel, and the rotation detection unit is inserted into an external wall of the frame along a diameter direction of the rotor shaft.

14. The DC motor of claim 11, wherein the rotation detection unit is one of a plurality of rotation detection units.

15. The DC motor of claim 11, wherein the one or more location detection devices comprise one or more reflectors that are arranged at regular intervals along a circumferential direction of the rotation panel, and the rotation detection unit comprises a light source and a light reception unit.

16. The DC motor of claim 11, wherein the one or more location detection devices comprise one or more slits or light absorption plates that are arranged at regular intervals along a circumferential direction of the rotation panel, and the rotation detection unit comprises a light source and a light reception unit.

17. The DC motor of claim 11, wherein the one or more location detection devices comprise permanent magnets that have an N pole and an S pole and are alternately arranged along a circumferential direction of the rotation panel, and the rotation detection unit comprises a magnetic flux sensor.

18. The DC motor of claim 11, wherein the one or more location detection devices comprise permanent magnets that have an N pole and an S pole and are alternately arranged along a circumferential direction of the rotation panel, and the rotation detection unit comprises coils arranged along a circumferential direction of the rotor shaft.

* * * * *